United States Patent [19]
Balling et al.

[11] Patent Number: 6,002,889
[45] Date of Patent: Dec. 14, 1999

[54] CAMERA WITH BUILT-IN DEPLOYABLE SUPPORT

[75] Inventors: Edward N. Balling, Rochester; Joel S. Lawther, East Rochester, both of N.Y.

[73] Assignee: Eastman Kodak Company, Rochester, N.Y.

[21] Appl. No.: 09/037,339

[22] Filed: Mar. 10, 1998

[51] Int. Cl.[6] .................................................. G03B 17/02
[52] U.S. Cl. ........................................ 396/535; 396/419
[58] Field of Search ................................. 396/419, 420, 396/423, 424, 425, 535

[56] References Cited

U.S. PATENT DOCUMENTS

| | | |
|---|---|---|
| 698,901 | 4/1902 | Brownell . |
| 1,478,318 | 12/1923 | Woodworth . |
| 3,592,117 | 7/1971 | Fukuda . |
| 4,545,660 | 10/1985 | Rudolf . |
| 4,751,540 | 6/1988 | Jones ........................................ 396/419 |
| 4,984,090 | 1/1991 | Sasaki et al. . |
| 5,081,478 | 1/1992 | Hayashida . |
| 5,384,609 | 1/1995 | Ogawa et al. . |

*Primary Examiner*—Howard B. Blankenship
*Attorney, Agent, or Firm*—Roger A. Fields

[57] ABSTRACT

A camera has a housing with a bottom face and a front face. A support leg is pivotable away from the bottom face of the housing and a handle is pivotable away from the front face of the housing which can together, but not individually, stably support the housing upright when they are both pivoted away from the housing.

3 Claims, 6 Drawing Sheets

CAMERA WITH BUILT-IN DEPLOYABLE SUPPORT

FIELD OF THE INVENTION

The invention relates generally to the field of photography, and in particular to a camera with a built-in deployable support.

BACKGROUND OF THE INVENTION

No matter how good a camera may be, it cannot yield really acceptable results if it is moved during the exposure. Much of the poor definition obtained by photographers is caused by camera shake during the time the shutter is open. At shutter speeds slower than 1/25 second some sort of camera support is always essential.

A tripod is undoubtedly the most effective answer to camera shake and should be used wherever possible; certainly whenever top quality results are desired. The tripod is a three-legged stand on the top of which the camera is fixed. Most tripods have telescoping or folding legs to make them compact for portability.

As shown in prior art U.S. Pat. No. 5,384,609 issued Jan. 24, 1995, the tripod can be integrated with the camera. This eliminates the need to attach the camera to the tripod whenever the tripod is to be used.

SUMMARY OF THE INVENTION

A camera comprising:

a housing having a bottom face and a front face; and a support leg pivotable away from the bottom face of the housing and a handle pivotable away from the front face of the housing which can together, but not individually, stably support the housing upright when they are both pivoted away from the housing.

DETAILED DESCRIPTION OF THE INVENTION

Figure 1:
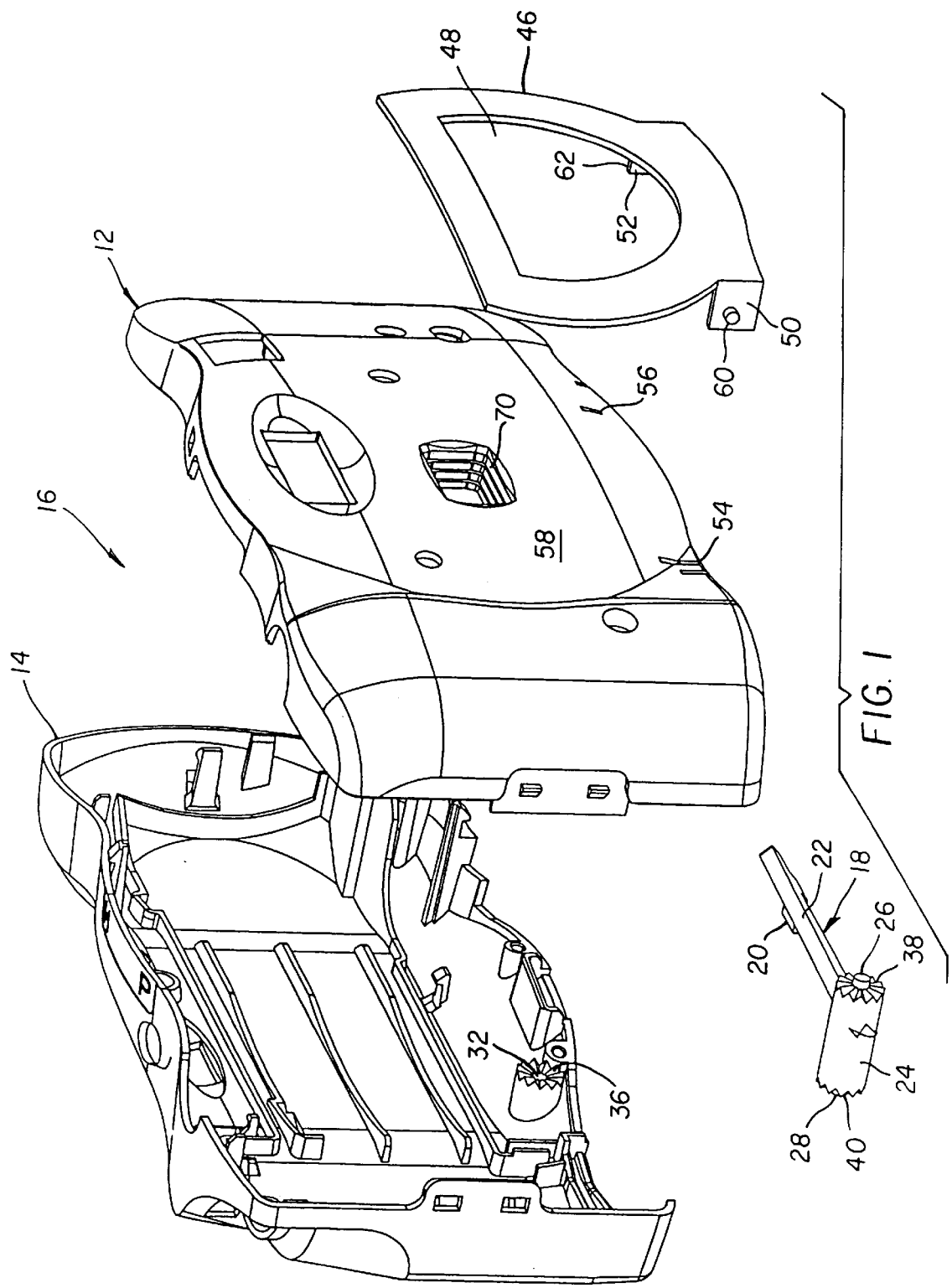
FIG. 1 is an exploded top, front perspective view of a camera with a built-in deployable support according to a preferred embodiment of the invention.
Figure 2:
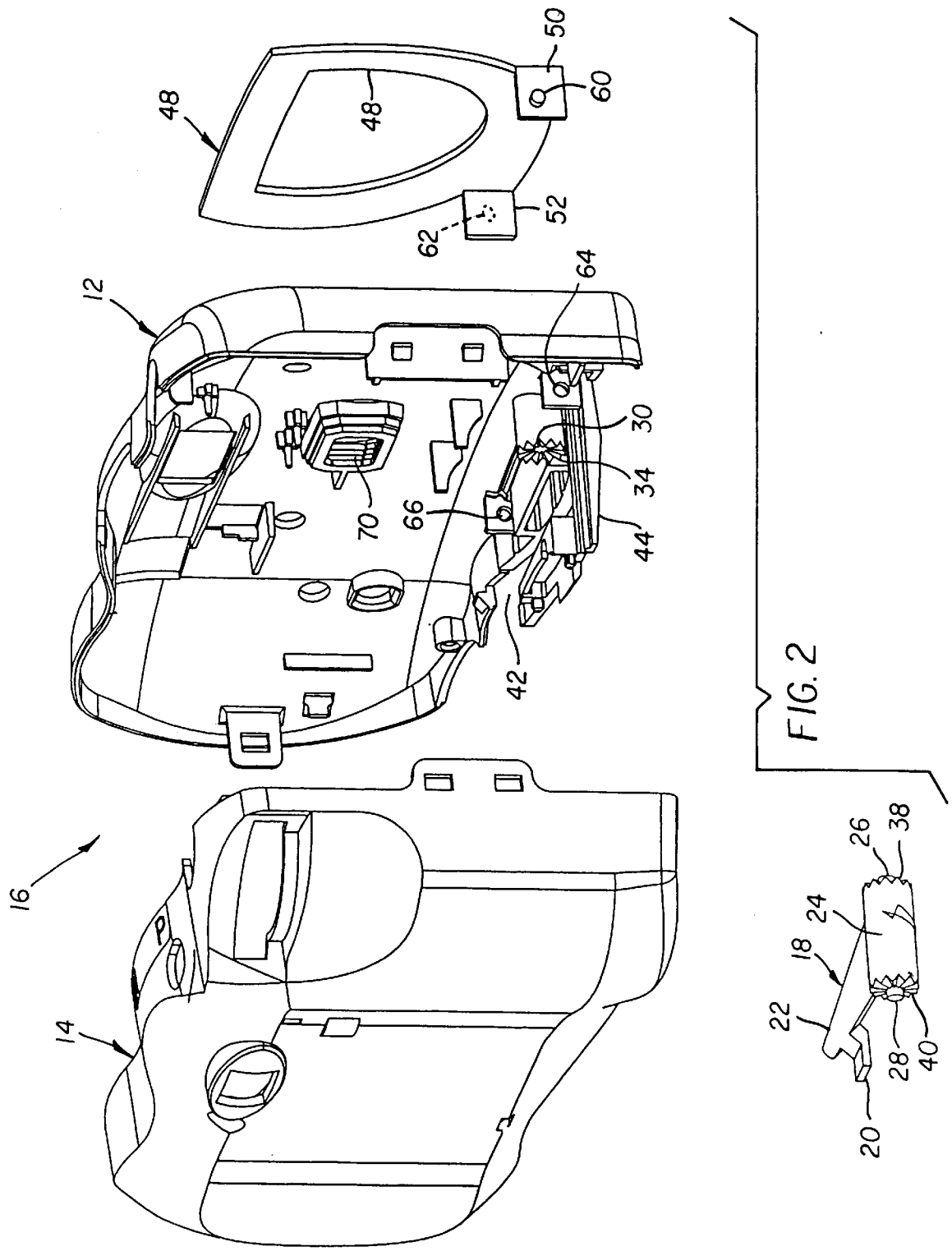
FIG. 2 is an exploded top, rear perspective view of the camera.
Figure 3:
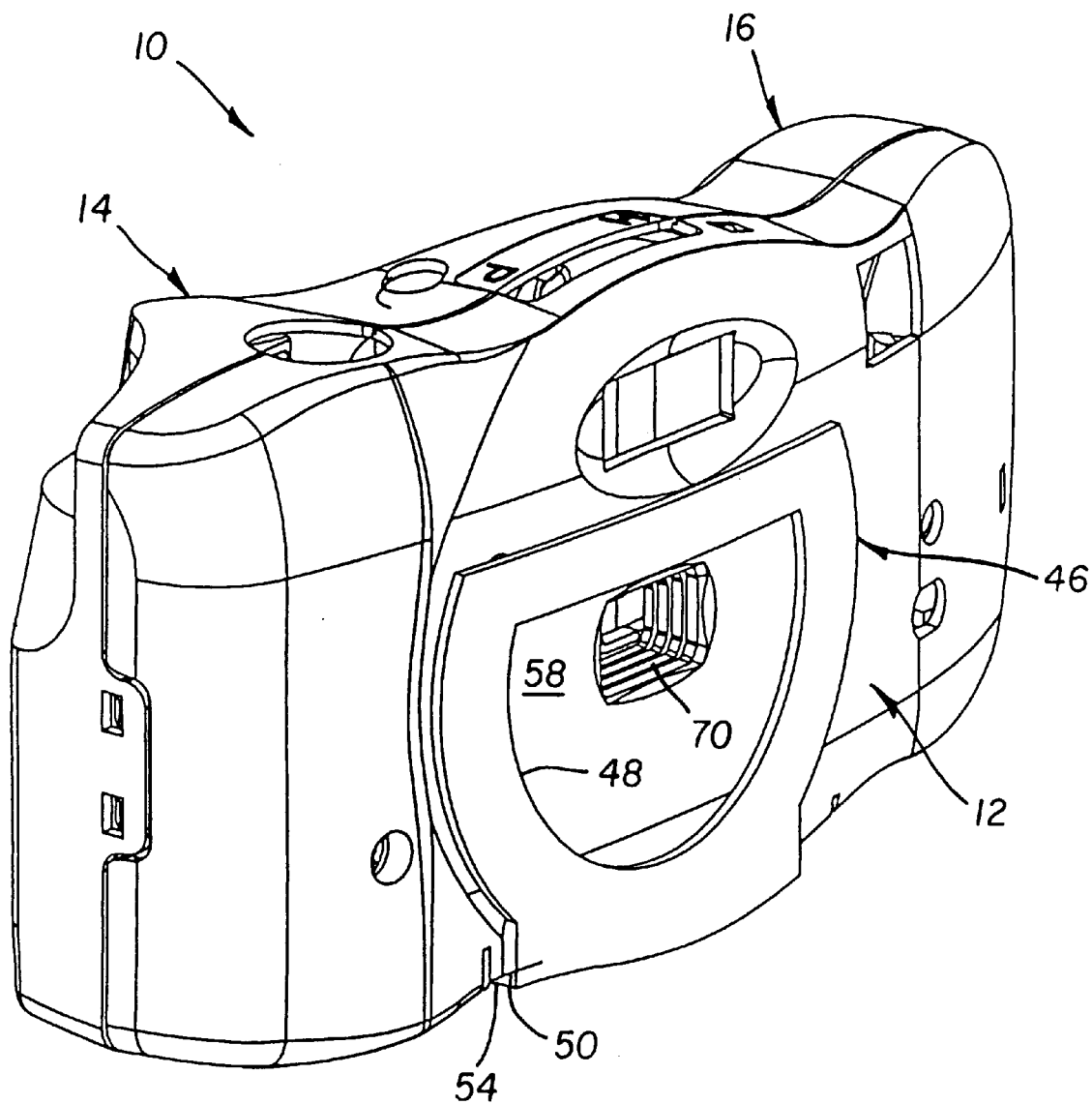
FIG. 3 is an assembled top, front perspective view of the camera showing the deployable support folded.
Figure 4:
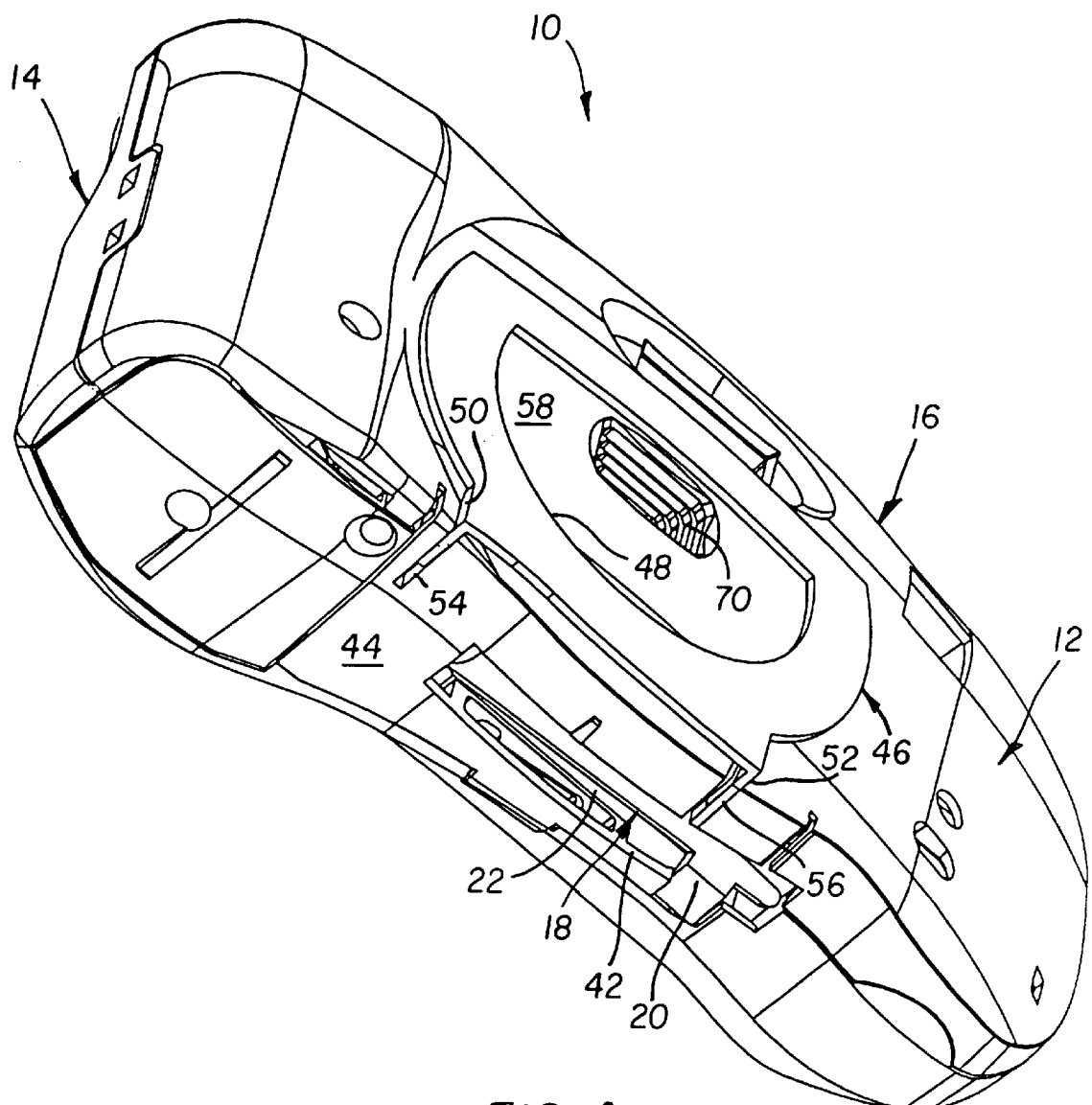
FIG. 4 is an assembled bottom, front perspective view of the camera showing the deployable support folded.

The invention is disclosed as being embodied preferably in a one-time-use camera such as disclosed in prior art U.S. Pat. No. 5,576,790 issued Nov. 19, 1996. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a one-time-use camera 10 having a pair of releaseably interlocking front and rear covers 12 and 14 that form a camera housing 16.

A support leg 18 for the housing 16 has an integral pull-tab 20 that laterally projects from a leg portion 22 of the support leg, and an integral end cylinder 24. The end cylinder 24 has respective coaxial pivot pins 26 and 28 that are rotatably supported within pin-holes 30 and 32 at the inside of the front and rear covers 12 and 14. See FIGS. 1 and 2. Respective circular arrays of detents 34 and 36 surround the pin-holes 30 and 32 at the inside of the front and rear covers 12 and 14 to engage with corresponding circular arrays of detents 38 and 40 which surround the coaxial pivot pins 26 and 28 on the end cylinder 24. Some slight axial movement of the end cylinder 24, including its pivot pins 26 and 28 and its detents 38 and 40, is permitted with respect to the detents 34 and 36 to allow the support leg 18 to be manually pivoted from a folded position shown in FIG. 4 to an unfolded position shown in FIG. 5. Alternatively, the detents 34, 36, 38 and 40 can be elastic. In the folded position, the support leg 18 is located inwardly adjacent an opening 42 in a bottom face 44 of the front cover 12. In the unfolded position, the support leg 18 angularly protrudes from the opening 42.

An external handle 46 for the housing 16 has a central hole 48 and respective integral tabs 50 and 52 that, protrude from the outside to the inside of the front cover 12, through right-angle slots 54 and 56 in a front face 58 of the front cover and in the bottom face 44 of the front cover. The tabs 50 and 52 have respective coaxial pivot pins 60 and 62 that are rotatably supported within pinholes 64 and 66 at the inside of the front cover 12. See FIG. 1 and 2. This allows the handle 46 to be manually pivoted from a folded position shown in FIGS. 3 and 4 to an unfolded position shown in FIG. 5. In the folded position, the handle 46 is located flush against the front face 58 of the front cover 12. In the unfolded position, the handle 46 angularly projects from the bottom face 44 of the front cover 12. Conventional releaseable engageable means are located on the front cover 12 and the handle 46 to maintain the handle in its folded and unfolded positions.

Figure 5:
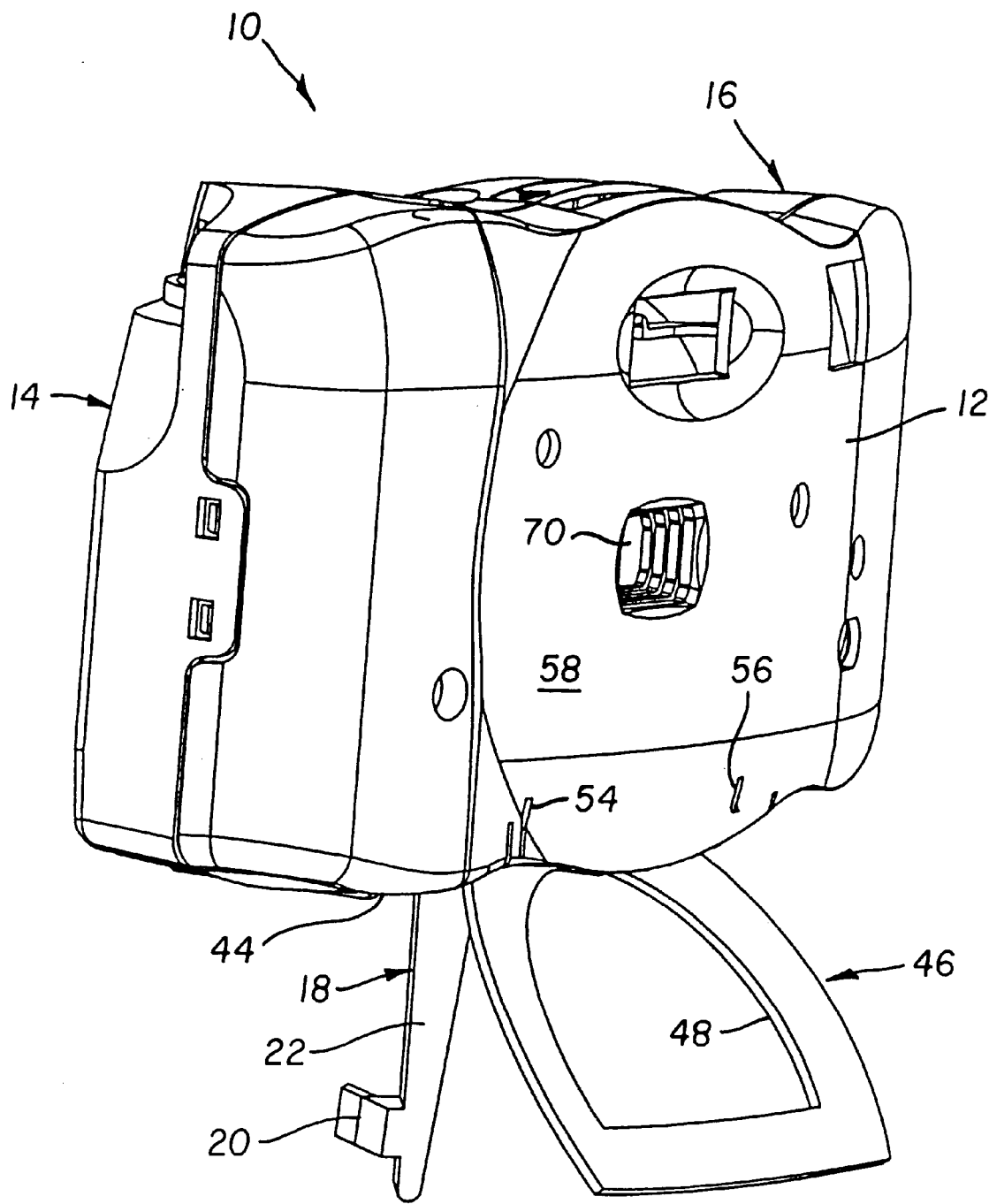
FIG. 5 is an assembled bottom, front perspective view of the camera showing the deployable support unfolded.

As shown in FIG. 5, when the support leg 18 and the handle 46 are both pivoted to their unfolded positions they (together) can stably support the housing 16 upright.

Figure 6:
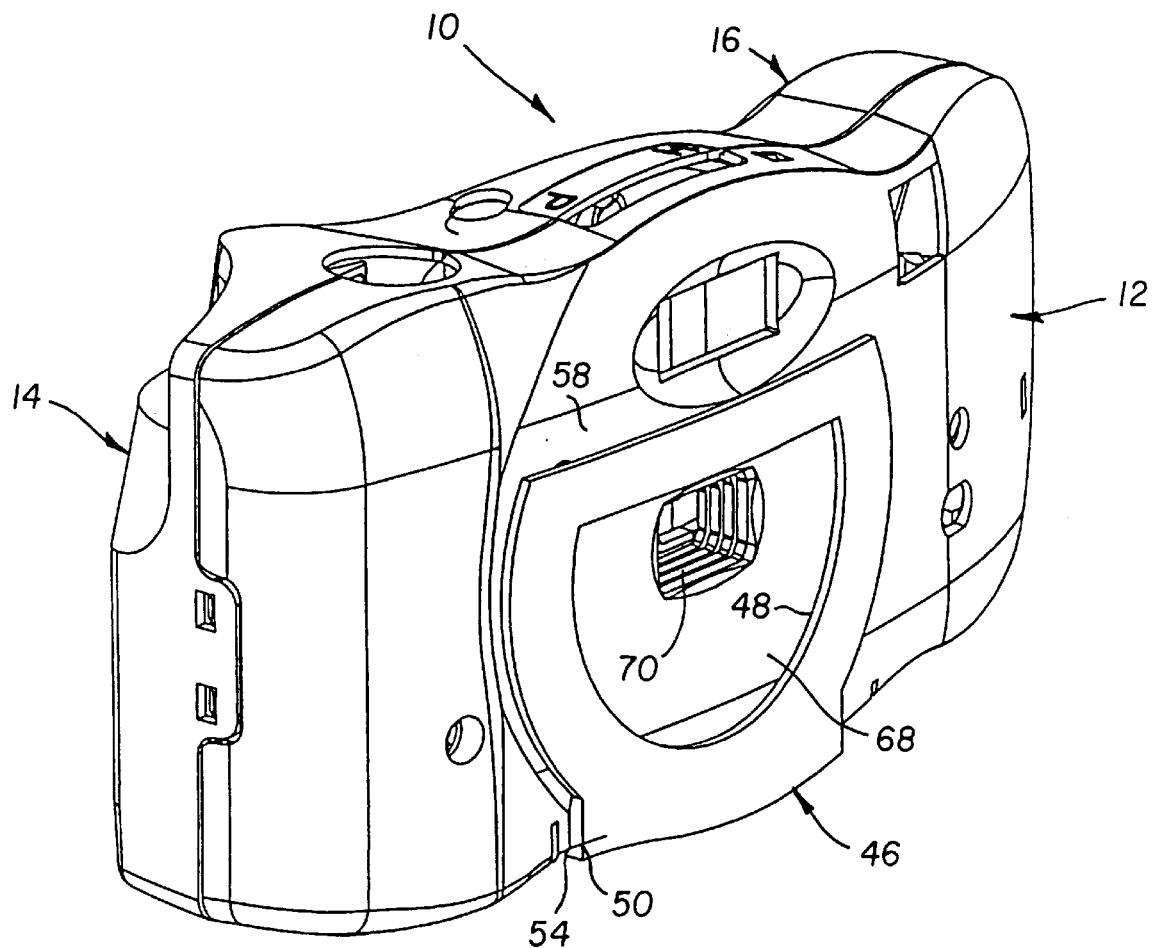
FIG. 6 is an assembled top, front perspective view of the camera as shown in FIG. 3, though modified according to an alternate embodiment of the invention.

Alternatively, as shown in FIG. 6, the handle 46 can have a transparent portion 68 that fills the central hole 48 in the handle. The transparent portion 68 is superimposed over a lens opening 70 in the front face 58 of the front cover 12 when the handle is in its folded position.

The invention has been described with reference to a preferred embodiment. However, it will be appreciated that variations and modifications can be effected by a person of ordinary skill in the art without departing from the scope of the invention.

PARTS LIST 10. one-time-use camera
12. front cover
14. rear cover
16. camera housing
18. support leg
20. pull-tab
22. leg portion
24. end cylinder
26. pivot pin
28. pivot pin
30. pin-hole
32. pin-hole
34. detent 36. detent
38. detent
40. detent
42. opening
44. bottom face
46. handle
48. central hole
50. tab
52. tab
54. slot
56. slot
58. front face
60. pivot pin
62. pivot pin
64. pin-hole
66. pin-hole
68. transparent portion
70. lens opening

What is claimed is:

1. A camera comprising:

a housing having a lens opening, a bottom face and a front face; and a support leg pivotable away from said bottom face of the housing and a handle pivotable away from said front face of the housing which can together stably support said housing upright when they are both pivoted away from the housing, and said handle is pivotable towards said front face of the housing to be folded against the front face and has a hole superimposed over said lens opening to permit ambient light to be passed through said hole to said lens opening when the handle is folded against the front face.

2. A camera comprising:

a housing having a lens opening, a bottom face and a front face; and a support leg pivotable away from said bottom face of the housing and a handle pivotable away from said front face of the housing which can together stably support said housing upright when they are both pivoted away from the housing, and said handle is pivotable towards said front face of the housing to be folded against the front face and has at least a transparent portion superimposed over said lens opening to protectively cover the lens opening when the handle is folded against the front face.

3. A camera as recited in claim 2, wherein said bottom face of the housing has an opening to the inside of said housing, and said support leg is pivotable through said opening from inside said housing to outside the housing.

* * * * *